United States Patent [19]
Houpt et al.

[11] Patent Number: 5,647,883
[45] Date of Patent: Jul. 15, 1997

[54] APPARATUS FOR MAKING HOLLOW MULTI-COMPONENT INSULATION FIBERS

[75] Inventors: Ronald A. Houpt, Newark; Larry J. Huey, Granville; David C. K. Lin, Worthington, all of Ohio

[73] Assignee: Owens Corning Fiberglas Technology Inc., Summit, Ill.

[21] Appl. No.: 473,056

[22] Filed: Jun. 7, 1995

Related U.S. Application Data

[62] Division of Ser. No. 309,706, Sep. 21, 1994, abandoned.

[51] Int. Cl.$^6$ .................... C03B 37/075; C03B 37/04
[52] U.S. Cl. .................... 65/494; 65/504; 65/521; 425/8; 425/131.5; 425/DIG. 217
[58] Field of Search ............... 65/438, 439, 494, 65/504, 521; 425/131.5, DIG. 217, 8

[56] References Cited

U.S. PATENT DOCUMENTS

| | | |
|---|---|---|
| 2,927,621 | 3/1960 | Slayter et al. . |
| 2,998,620 | 9/1961 | Stalego .................... 65/504 X |
| 3,073,005 | 1/1963 | Tiede . |
| 3,121,254 | 2/1964 | Heynen et al. .................... 65/494 X |
| 3,259,479 | 7/1966 | Tiede . |
| 3,282,667 | 11/1966 | Stalego et al. . |
| 3,333,932 | 8/1967 | Tiede .................... 65/504 X |
| 3,510,393 | 5/1970 | Burgman et al. .................... 65/439 X |
| 4,022,603 | 5/1977 | Roeder et al. . |
| 4,296,164 | 10/1981 | Bemis et al. . |
| 4,303,433 | 12/1981 | Torobin .................... 425/DIG. 217 X |
| 4,366,927 | 1/1983 | Kielmeyer . |
| 4,373,005 | 2/1983 | Goodwin . |
| 4,526,597 | 7/1985 | Olinger et al. .................... 65/439 |
| 4,620,859 | 11/1986 | Lin et al. . |
| 4,622,054 | 11/1986 | Huey et al. . |
| 4,756,957 | 7/1988 | Kielmeyer . |
| 4,758,259 | 7/1988 | Jensen . |
| 4,829,738 | 5/1989 | Moss . |
| 4,842,928 | 6/1989 | Kielmeyer . |
| 4,846,864 | 7/1989 | Huey . |
| 4,853,001 | 8/1989 | Hammel . |
| 4,909,817 | 3/1990 | Gill et al. . |
| 4,941,904 | 7/1990 | Barch et al. . |
| 5,320,512 | 6/1994 | Moore .................... 425/DIG. 217 X |
| 5,367,849 | 11/1994 | Bullock . |
| 5,468,275 | 11/1995 | Lin et al. .................... 65/504 X |
| 5,474,590 | 12/1995 | Lin .................... 65/504 X |
| 5,482,527 | 1/1996 | Czastkiewicz .................... 65/504 X |
| 5,484,650 | 1/1996 | Hernandez . |
| 5,509,953 | 4/1996 | Gavin .................... 65/504 X |
| 5,514,199 | 5/1996 | Houpt .................... 65/504 X |

FOREIGN PATENT DOCUMENTS

WO8000695  4/1980  WIPO .

*Primary Examiner*—Melvin Mayes
*Attorney, Agent, or Firm*—C. Michael Gegenheimer; Curtis B. Brueske

[57] ABSTRACT

A fiber insulation product comprising hollow fibers. Each hollow fiber may be composed of at least two different thermoplastic insulating materials, such as glasses, having differing coefficients of thermal expansion, with each of the hollow fibers being an irregular-shape exhibiting a substantially uniform volume filling nature, and providing improved recovery and thermal conductivity abilities even in the absence of a binder material. An apparatus for making hollow fibers for such a product is also provided.

19 Claims, 10 Drawing Sheets

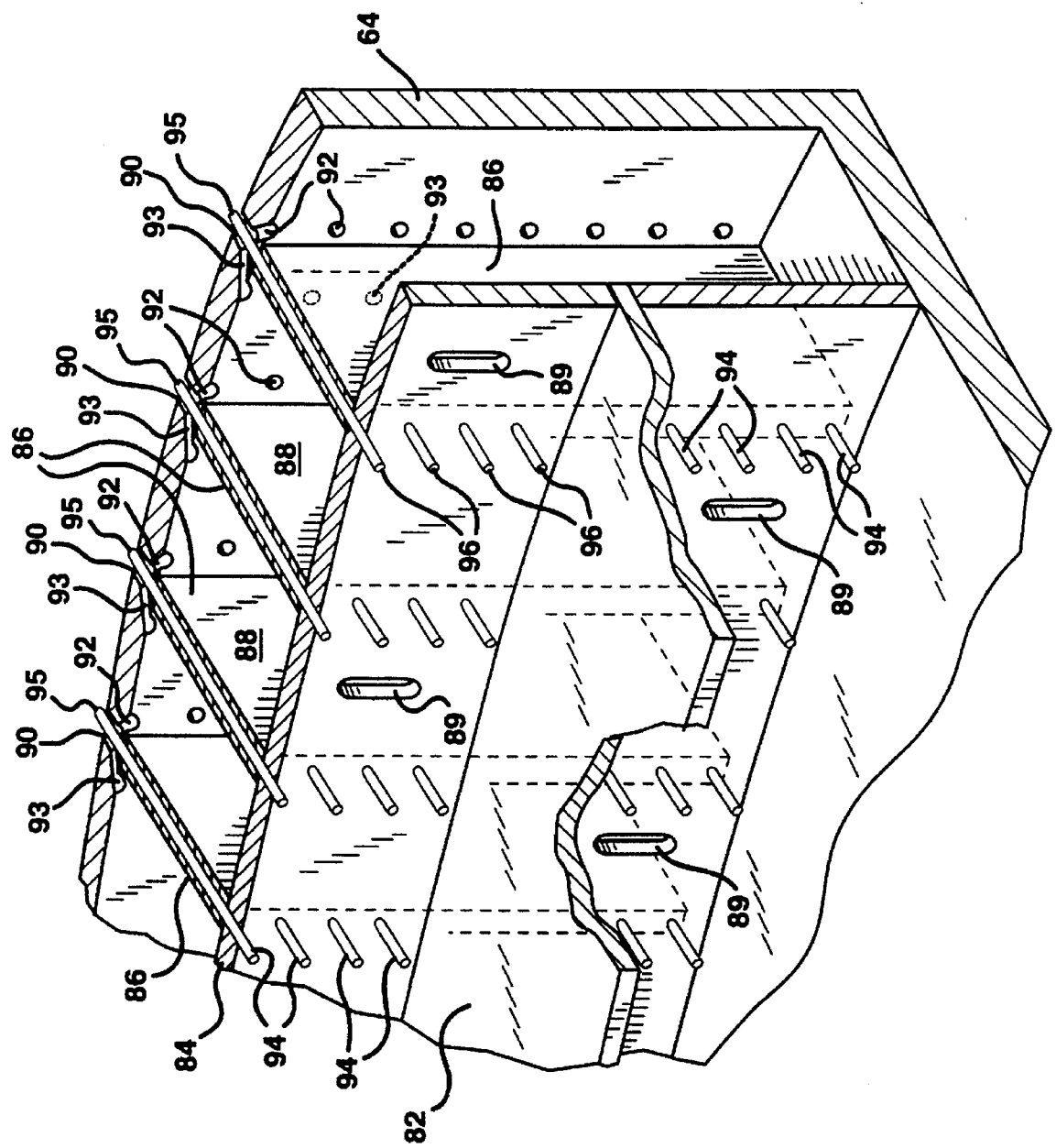

APPARATUS FOR MAKING HOLLOW MULTI-COMPONENT INSULATION FIBERS

This is a division of application Ser. No. 08/309,706, filed Sep. 21, 1994, now abandoned.

FIELD OF THE INVENTION

This invention relates to wool materials of hollow mineral fibers and, more specifically, to insulation products of hollow multi-component glass fibers. The invention also pertains to the manufacturing of hollow fibers from thermoplastic materials, and more particularly to a spinner apparatus for centrifuging multi-component fibers from two streams of molten thermoplastic materials such as glass or other mineral fibers or polymer fibers.

BACKGROUND OF THE INVENTION

Small diameter solid fibers of glass and other thermoplastic materials have been used in a variety of applications including acoustical or thermal insulation materials. When these small diameter glass fibers are properly assembled into a lattice or web, commonly called a wool pack, glass fibers which individually lack strength or stiffness can be formed into a product which is quite strong. The glass fiber insulation which is produced is lightweight, highly compressible and resilient. For purposes of this patent specification, use of the term "glass" is intended to include any of the glassy mineral materials, such as rock, slag and basalt, as well as traditional glasses.

The common prior art methods for producing glass fiber insulation products involve producing solid fibers of glass from a rotary process. A single molten glass composition is forced through the orifices in the outer wall of a centrifuge commonly known as a spinner, producing primarily solid and straight glass fibers. The fibers are drawn downward by a blower. A binder required to bond the fibers into a wool product is sprayed onto the fibers as they are drawn downward. The fibers are then collected and formed into a wool pack.

When forming insulation products of glass fibers, the ideal insulation would have uniform spacing between the fibers and the surface area of the fibers would be maximized. Insulation is basically a lattice for trapping air between the fibers and thus preventing movement of air. The lattice also retards heat transfer by scattering radiation. A more uniform spacing of fibers and an increase in fiber surface area would maximize scattering and, therefore, would have greater insulating capability.

In the production of wool insulating materials of glass fibers, it becomes necessary to use fibers that are relatively short. Long fibers tend to become entangled with each other forming ropes or strings. These ropes create a deviation from the ideal uniform lattice and reduce the insulating abilities of the glass wool. However, short fibers that are straight form only a haphazard lattice, and some of the fibers lie bunched together. It is clear that existing glass wool insulating materials have significant non-uniformities in the distribution of fibers within the product. Thus, the ideal uniform lattice structure cannot be achieved.

Additionally, when using straight fibers it is necessary to add an organic binder material to the fibers. The binder is required to hold the product together by bonding at the fiber to fiber intersections. Not only is the binder itself expensive, but great pains must be taken to process effluent from the production process due to the negative environmental impact of most organic compounds. Further, the binder must be cured with an oven using additional energy and creating additional environmental cleanup costs.

As the number of fibers used in the insulation product is increased, the surface area of the fibers is also increased as well as the insulating capability of the resultant wool product. However, increasing the number of fibers also increases the cost of the product due to the cost of the additional material used. Even small changes in the amount of fiber material used can impact production costs.

In the shipping and packaging of insulation products, high compressibility is preferred. It is desirable to compress the wool for shipping and then have it recover rapidly and reliably to the desired size. Current insulation products are limited in the amount of compression possible while still attaining adequate recovery. When the product is compressed, the binder holds firm while the fibers themselves flex. As the stress upon the fibers increases due to excessive compression, the fibers break.

Attempts have been made in the prior art to produce non-straight solid glass fibers. In a mechanical kink process, glass fibers are pulled from a textile bushing. While still at high temperatures, the fibers are pulled by mechanical means through a series of opposed gears or a crimping device to attenuate and crimp them. The net result is a bundle of kinked glass fibers.

The major disadvantage to mechanical kinking is that the fibers are not conducive to satisfactory glass wool production. Every fiber produced in this manner has a uniform shape, defeating the purpose of the kink, because the glass wool produced does not have a uniform distribution. Further, because the process is non-rotary, it has an unsatisfactory low throughput and the fibers produced are too coarse for wool insulating materials.

Stalego, U.S. Pat. No. 2,998,620, discloses curly (helical) glass fibers of bicomponent glass compositions. Stalego discloses producing staple curly fibers by passing two glass compositions having differing coefficients of thermal expansion through the orifices of a spinner. The glasses are extruded as a solid dual glass stream in aligned integral relationship such that the fibers curl naturally upon cooling due to the differences in their coefficients of thermal expansion. However, Stalego discloses employing the curled fibers in the processing of yarns such as being woven into fabric or included as a reinforcement in fired pottery and clays. Stalego does not disclose the use of curly fibers in insulation products. In addition, Stalego discloses in one embodiment a spinner having vertically aligned compartments separated by vertical baffles around the periphery of the spinner, with alternate compartments containing the different glasses. The patentee teaches that an orifice wider than the baffle is to be drilled where the baffle intersects the spinner peripheral wall. As the orifice is wider than the baffle, the orifice is in communication with both of the vertical compartments on either side of the baffle, and both the A glass and B glass will exit the spinner from the orifice, forming a solid dual glass stream.

Tiede in U.S. Pat. No. 3,073,005 discloses a non-rotary process for making bicomponent curly solid glass fibers. The fibers are made by feeding differing glass compositions to an orifice in side by side contact such that the two glasses are attenuated into a single fiber. Tiede discloses using the glasses in fabric production as well as cushion and floatation materials. Tiede does not disclose insulation products made with curly glass fibers.

Slayter et al. in U.S. Pat. No. 2,927,621 also discloses the production of curly fibers. In Slayter, solid glass fibers of a single glass composition are passed through opposed contoured skirts after the fibers have been softened by hot gases. The fibers then take on the shape of the contour of the skirts. However, the thick, long fibers are unsuitable for insulating materials. Rather, the produced fibers are employed in filtering media, and additionally have a binder applied.

Accordingly, a need exists for an improved wool insulating material with a uniform volume filling nature and a maximized fiber surface area such that the wool insulating material has improved recovery and reduced thermal conductivity, remains cost effective, and can be employed without the use of a binder material. It would also be desirable to produce an improved wool insulating material which has the aforementioned attributes but which can be produced with reduced amounts of fiber material.

SUMMARY OF THE INVENTION

In accordance with the principles of the present invention these needs are met by providing insulation products that are produced using hollow fibers made from suitable thermoplastic insulation materials such as glass, and preferably using fibers which are irregular in shape and generally hollow. An insulation product employing hollow fibers can perform generally as effectively or better than the same product made from solid fibers, yet require substantially less insulation material to produce. Up to twice as many or more hollow fibers can be produced from the same amount of fiber insulation material used to form solid fibers. With more fibers being used, the overall surface area of fibers in the insulation product can be increased even though less insulation material is being used. Increasing the fiber surface area increases performance by lowering the thermal conductivity (i.e., "k") of the insulation product.

By employing hollow fibers that are irregular, rather than straight, kinked or even curly, a more uniform lattice structure can also be achieved. This is referred to as uniform volume filling. The increased uniformity will allow higher recovery ratios after being compressed. More importantly, uniform volume filling results in even greater reductions in thermal conductivity. Also, the greater entanglement of irregularly-shaped fibers could allow sufficient wool pack integrity without the use of an organic binder. By sufficient integrity it is meant that the fibers of the wool batt will remain entangled and not separate when an 8 ft. (2.4 m) wool batt is suspended under its own weight either along its length or along its width. These are referred to as the machine direction and the cross direction, respectively. However, if so desired, a binder material may be added to provide additional strength to the wool insulating material. Also, the irregular shape of the fibers of the invention makes the product less prone to cause irritation, and may make the product less dusty. Ideally, each fiber is different in shape to obtain a more uniform volume filling nature.

In accordance with one aspect of the invention there is provided a plurality of irregularly-shaped hollow glass fibers and an insulation product comprising such fibers. The hollow nature of the fibers may be quantified in terms of their void fraction, which is defined as $(D_i/D_o)^2$, where $D_i$ is the inside diameter and $D_o$ is the outside diameter of the fiber. While benefits can be realized with almost any degree of void fraction, in general, the greater the void fraction the greater the benefits obtained. Each of the preferred hollow glass fibers has a void fraction of greater than about 30%, more preferably greater than about 40%, and even more preferably in the range of from about 50% to about 80%.

In accordance with a second aspect of the present invention, each of the irregularly-shaped hollow glass fibers comprises at least two distinct glass compositions with different coefficients of thermal expansion. The difference in the coefficient of thermal expansion between two glass compositions is preferably greater than about 2.0 ppm/°C. (parts per million), more preferably greater than about 4.0 ppm/°C., and most preferably greater than about 5.0 ppm/°C. Further, the fibers are preferably binderless. The term "binderless" is intended to mean that binder materials comprise less than or equal to 1% by weight of the product. Further, the term "binder" is not meant to include materials added for dust suppression or lubrication.

In accordance with a third aspect of the invention there is provided a wool insulating product comprising irregularly-shaped hollow glass fibers with a substantially uniform volume filling nature, wherein each of the fibers consists of at least a first glass composition and a second glass composition. The first glass composition generally varies within the range of from about 15 to about 85% of the total glass content of each hollow fiber. The second glass composition comprises the balance of the glass content of each fiber. A small fraction of the fibers may be single composition. For purposes of this patent specification, in using the terms "glass fibers" and "glass compositions", "glass" is intended to include any of the glassy forms of materials such as rock, slag, and basalt, as well as traditional glasses. Thermoplastic materials and thermoplastic fibers include, in addition to glass and other mineral fibers, fibers from polymer materials such as polyester fibers and polypropylene fibers.

In accordance with a forth aspect of the present invention, an apparatus is provided for making multiple component hollow fibers. The apparatus includes a housing, such as that of a spinner, having a peripheral wall with a plurality of fiber forming nozzles or tips. Each nozzle can be a separate part but is preferably formed as an integral part of the housing wall in order to reduce costs and increase the density of orifices that are possible on the wall. Each nozzle has at least a first and a second passage through which a first and a second molten thermoplastic material respectively flow to a fiber forming orifice located in the peripheral wall. The first and second passages of the nozzle are respectively in fluid communication with a source of the first and second molten thermoplastic materials. Preferably, in the case of a spinner, the housing is divided into a series of compartments by baffles, with each compartment receiving one of the molten thermoplastic materials. Each of the nozzle passages extends from one of the compartments. The passages in adjacent ones of the compartments communicate with one another and with the orifices to merge the first and second molten thermoplastic materials together. A gas conduit is operatively adapted to provide each nozzle with a suitable gas, such as air, nitrogen, argon, combustion gases, etc., for being ingested into the molten thermoplastic materials flowing out of the orifice to thereby form a multiple component hollow fiber. In the case of a spinner, generally vertically-aligned compartments have been found most preferable with the baffles positioned circumferentially around the interior of the peripheral wall.

The first and second molten thermoplastic materials are supplied to the housing by any suitable equipment. For example, with a spinner, if the materials are glasses, the equipment will include melting furnaces and forehearths to supply the molten glasses. A divider is provided in the housing for directing the first molten thermoplastic material into alternate ones of the compartments and for directing the second molten thermoplastic material into the remaining ones of the compartments so that adjacent compartments contain different thermoplastic materials.

In one form, adjacent ones of the passages in adjacent compartments may converge in either a V- or Y-shape, or into a slot shaped orifice. In one embodiment, each gas conduit comprises a tube disposed through one of the baffles and out the orifice, preferably extending beyond the peripheral wall. The tube is sized so as to provide a gap between it and the perimeter of the orifice of sufficient size to permit the multiple molten thermoplastic materials to be extruded therethrough. Preferably, those passages in adjacent compartments converge at an angle of from about 14° to about 45° from normal to the spinner peripheral wall (i.e., a relative angle between them of about 28° to 90°). The passages are sized to provide a build up of molten thermoplastic materials in the compartments and preferably so that substantially equal proportions of the two molten thermoplastic materials are provided to the orifices. The ratio of the thermoplastic materials present in the fibers may be adjusted by changing the flow rate of each molten material. However, it should be appreciated that the size of the passages may need to be varied to control the flow rates.

The divider in the preferred spinner includes a generally horizontal flange positioned intermediate the spinner peripheral wall. The divider preferably further includes a generally vertical interior wall, with the interior wall including a series of orifices therein spaced to provide access for the first molten thermoplastic material into alternate ones of the compartments and to provide access for the second molten thermoplastic material into the remaining ones of the compartments.

In a preferred embodiment of the invention, the thermoplastic materials are glasses, and the spinner is adapted to receive two separate molten glass streams for fiberization into dual glass hollow fibers.

Accordingly, it is a feature of the present invention to provide a series of orifices positioned in a spinner peripheral wall which are fed with different molten thermoplastic materials by passages from adjacent compartments, with the molten material being ingested with a suitable gas to form multiple component hollow fibers. This, and other features and advantages of the present invention will become apparent from the following detailed description, the accompanying drawings, and the appended claims.

BRIEF DESCRIPTION OF THE DRAWINGS

FIG. 9 is a perspective view taken from the interior of the spinner showing the divider and compartments for the A and B components;

DETAILED DESCRIPTION OF THE INVENTION

The invention will be described in terms of insulation products made from irregularly-shaped dual glass hollow fibers and apparatus for making same. It is to be understood that the invention encompasses insulation products made from and apparatus for making not only dual component glass hollow fibers but also single component glass hollow fibers and single or multiple component hollow fibers made from other thermoplastic materials such as polyester or polypropylene. In addition, the present invention also applies to single or multiple component hollow fibers having other than irregular shapes, for example curly (helical) fibers.

Figure 1:
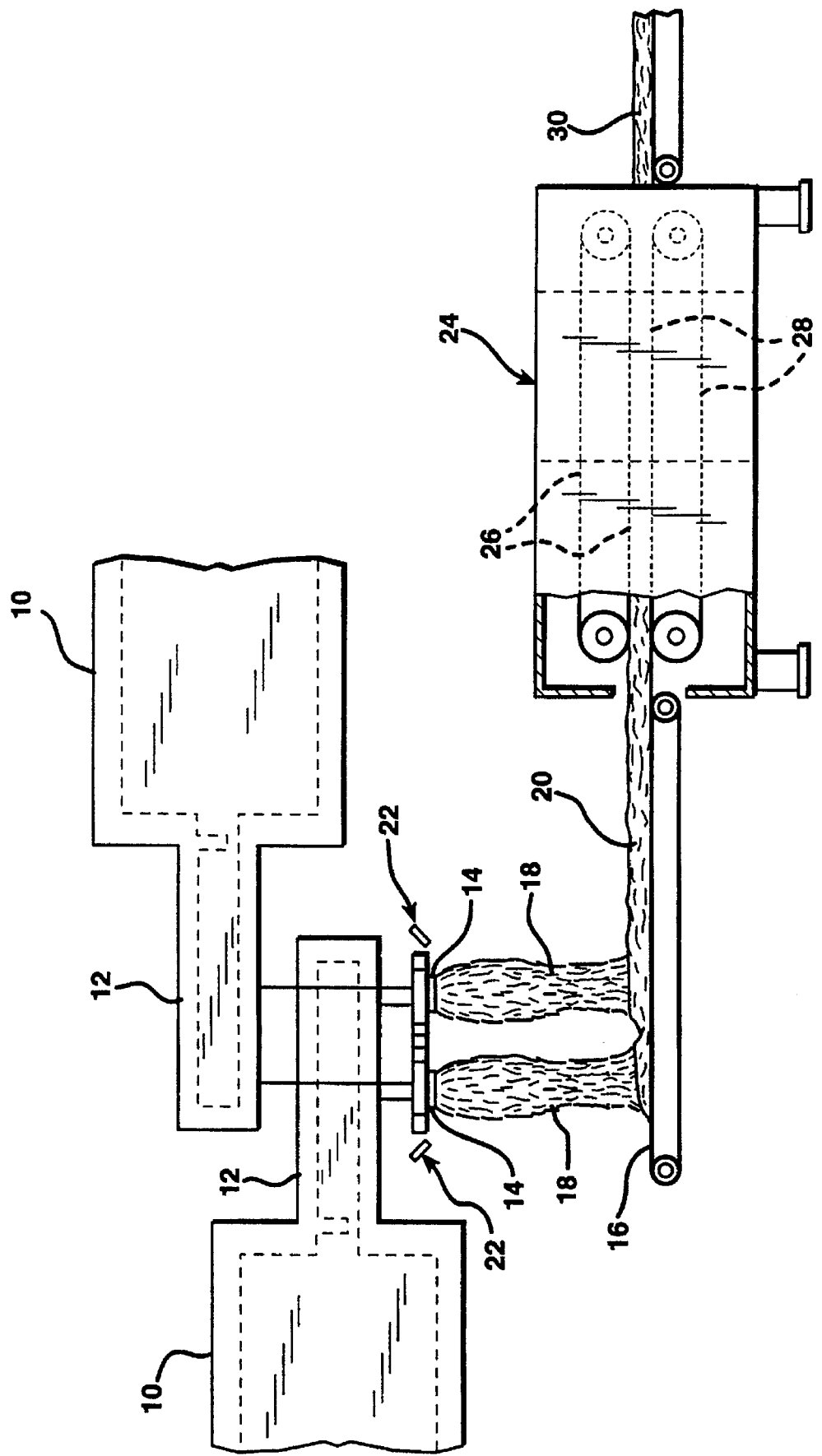
FIG. 1 is a schematic view in elevation of apparatus for making dual component hollow fibers in accordance with the present invention.

The insulation products made of irregularly-shaped hollow glass fibers of the present invention may be produced from a rotary fiber forming and pack heat setting process as shown in FIG. 1. Two distinct molten glass compositions (A glass and B glass) are supplied from any suitable source of glass such as furnaces 10 and forehearths 12 to rotary fiberizers 14. As discussed more explicitly below, the fiberizers form hollow, dual component fibers. Preferably, the glasses have different mechanical attributes so that upon cooling, they will assume an irregular (as opposed to straight) configuration. Such different mechanical attributes may be, for example, differing coefficients of thermal expansion, differing melting points, differing viscosities, or differing mechanical strengths. Veils 18 of hollow dual glass fibers, such as irregularly-shaped hollow glass fibers produced by the fiberizers 14, are collected on conveyor 16 as wool pack 20 by means of a vacuum positioned beneath the conveyor (not shown). As the fibers are blown downwardly by air or gases to conveyor 16 by means of blowers 22 adjacent the fiberizers 14, they attenuate, cool, and attain their irregular shape.

The wool pack 20 may then optionally be passed through oven 24 at heat setting temperatures of from about 700° to 1100° F. (371° to 593° C.). The heat setting temperature may be achieved either by retarding the fiber cooling process after fiber forming to retain some of the heat from the fiber forming process, or by reheating the fibers in heat setting oven 24. While passing through the oven, wool pack 20 is shaped by top conveyor 26 and bottom conveyor 28, and by edge guides (not shown). While in oven 24, the glass fibers may be subjected to flows of hot gases to facilitate uniform heating. When the fibers are constrained by conveyors 26 and 28, the fibers are stressed in the manner of a compressed spring. When subjected to heat setting temperatures, the fibers relax, reducing stress, so that when the constraints are removed, the wool pack does not expand but holds its desired shape. After a period of up to 10 minutes, the wool pack then exits oven 24 as insulation product 30. The fibers bend as they cool and become more entangled, enhancing the insulation product's structural integrity.

Figure 2:
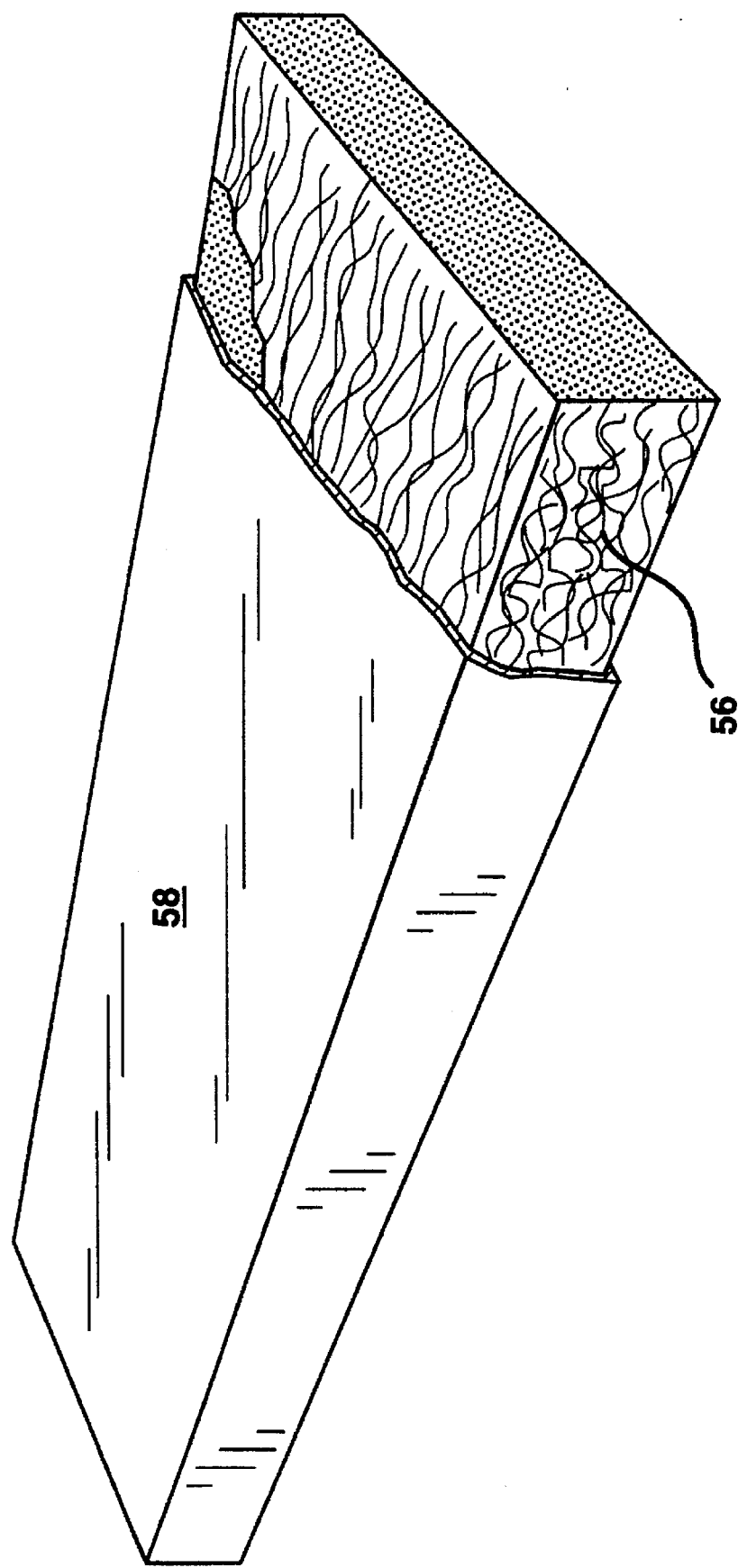
FIG. 2 is a schematic view in perspective of an embodiment of the insulation product of the present invention.

It is to be understood that heat setting is an optional aspect of the present invention. Alternatively, the wool pack may be encapsulated with an exterior plastic layer as taught by Schelhorn et al, U.S. Pat. No. 5,277,955, the disclosure of which is hereby incorporated by reference in its entirety. FIG. 2 illustrates a section 56 of a wool pack encapsulated within an exterior polymeric layer 58. Further, the wool pack may be subjected to other fabrication techniques including stitching, needling, or hydro-entanglement.

Figure 3:
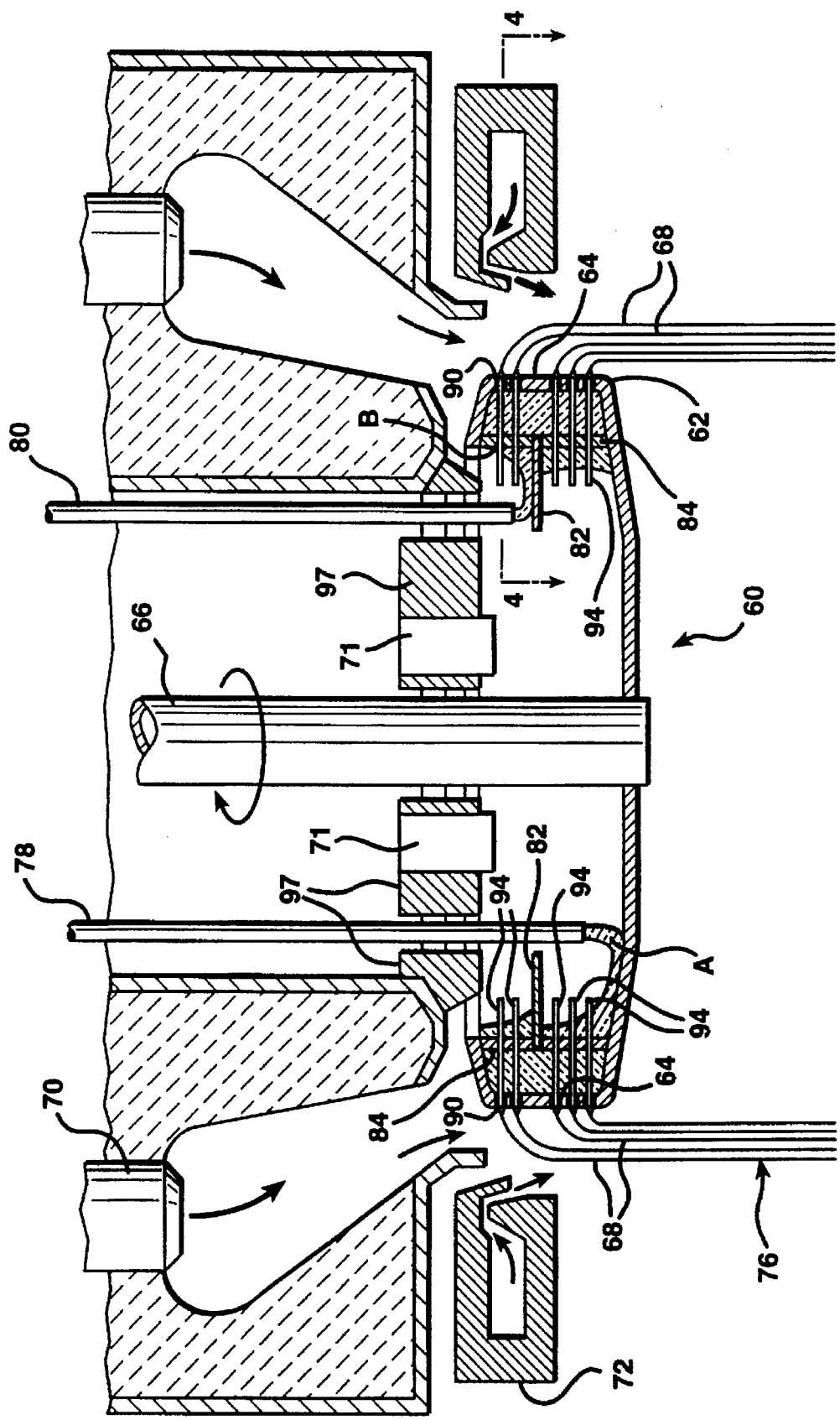
FIG. 3 is a cross-sectional view in elevation of the fiberizer/spinner used in the practice of the invention.

As shown in FIG. 3, spinner 60 includes a housing having a spinner peripheral wall 64 and a spinner bottom wall 62. The spinner 60 is rotated on spindle 66, as is known in the art. The rotation of the spinner 60 centrifuges molten glass through orifices in the spinner peripheral wall 64 to form primary hollow fibers 68, in a manner described in greater detail later on. The primary hollow fibers 68 are maintained in a soft, attenuable condition by the heat of annular burner 70. An internal burner 71 (shown schematically) is preferably used to heat the interior of spinner 60 to help maintain the glasses in a suitably molten state and, as will be discussed later in detail, to provide combustion gases used in making the primary fibers 68 hollow. Annular blower 72 is positioned to pull primary fibers 68 and further attenuate them into secondary dual-glass hollow fibers 76, suitable for use in wool insulating materials. The irregularly-shaped dual-glass hollow fibers 76 are then collected on a conveyor (as shown in FIG. 1) for formation into a wool pack.

The interior of spinner 60 is supplied with two separate streams of molten glass, a first stream containing glass A and a second stream containing glass B. The glass in the first stream drops from a first delivery tube 78 directly onto spinner bottom wall 62 and flows outwardly due to the centrifugal force toward spinner peripheral wall 64 to form a head of glass A as shown. Glass B, delivered via a second delivery tube 80, is positioned closer to spinner peripheral wall 64 than the first stream, and the B glass in the second stream is intercepted by horizontal annular flange 82 before it can reach the spinner bottom wall 62. Thus, a build-up or head of glass B is formed above horizontal flange 82 as shown.

Figure 4:
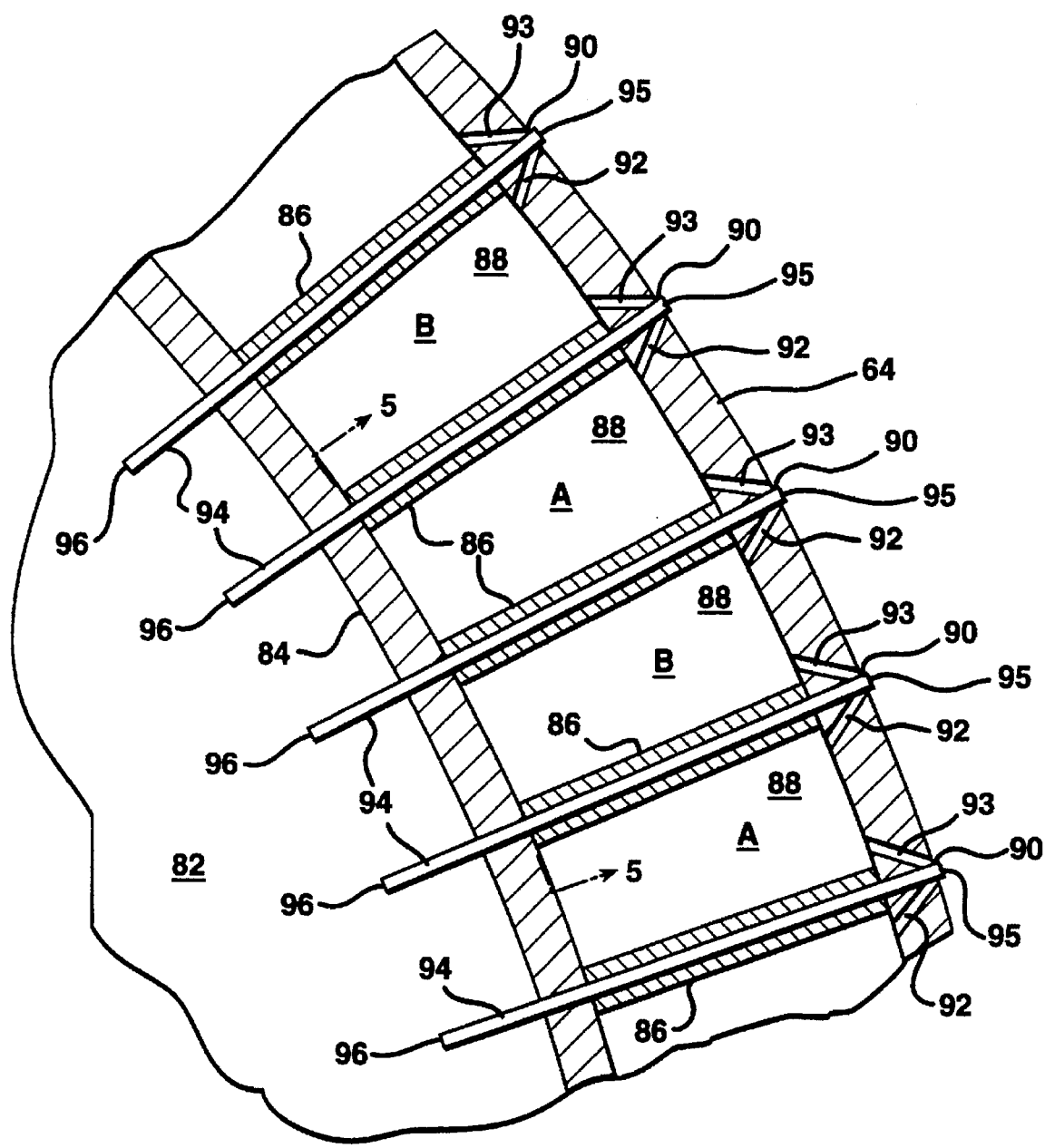
FIG. 4 is a plan view, partly in section, of a portion of the spinner taken along line 4—4 of FIG. 3 with the annular blower excluded.

As best shown in FIGS. 4 and 9, the spinner 60 is adapted with a vertical interior wall 84 which is generally circumferential and positioned radially inwardly from the spinner peripheral wall 64. A series of vertical baffles 86, positioned between spinner peripheral wall 64 and vertical interior wall 84, divide that space into a series of generally vertically-aligned compartments 88 which run substantially the entire height of spinner peripheral wall 64. Alternate compartments contain glass A and glass B which flow, respectively, into the compartments 88 through slots 89 in interior wall 84. It can be seen that horizontal flange 82, vertical interior wall 84, and baffles 86 together comprise a divider for directing glasses A and B into alternating adjacent compartments 88 so that every other compartment contains glass A while the remaining compartments contain glass B.

Spinner peripheral wall 64 has orifices 90 located thereon. Orifices 90 are positioned adjacent to, and in general alignment with, the radial outward edges of the vertical baffles 86. As can been seen in FIGS. 5 and 9, a series of ports or passages 92 and 93 are located in each of the compartments 88 through which molten thermoplastic material will flow. Preferably, these passages 92 and 93 are located adjacent either side of baffles 86, with each pair of passages being operatively adapted to communicate with one another and one of the orifices 90 in the peripheral wall 64. In this way, each set of passages 92 and 93 and orifice 90 forms a nozzle enabling a flow of both glass A and glass B to emerge from the orifice 90 to permit a single dual-glass primary fiber 68 to be formed. Preferably, each slot 89 is sized so that a sufficient amount of molten glass accumulates in its corresponding compartment 88 to ensure that the molten glass flows out of each orifice uniformly.

A gas conduit 94, a tube in the illustrated embodiment, is used to provide each nozzle with a suitable gas, such as air, nitrogen, argon, combustion gases, etc., for being ingested into the molten A and B glass components flowing out of the orifice 90 to form a hollow bore in the emerging dual-glass primary fiber 68. The gas conduits 94 extend through bore holes provided in the interior wall 84, the baffles 86 and the spinner peripheral wall 64, see FIGS. 4 and 9. Each tube 94 may be secured in place by any suitable method, such as by welding or brazing. Each tube 94 has a leading end 95 extending beyond the spinner peripheral wall 64 and a trailing end 96 extending radially inward of interior wall 84 into the interior of spinner 60.

In the illustrated embodiment, one or more burners 71 burn natural gas, mostly methane, producing a combustion gas that fills the interior of spinner 60. A bottom center casing plate 97 (see FIG. 3) is used in combination with the burners 71 to sufficiently seal the spinner 60 so that the combustion gases buildup a back pressure $P_1$ in the interior of spinner 60 as they exit from the burners 71. In this way, the interior of spinner 60 functions as a manifold supplying pressurized combustion gases to the trailing end 96 of each tube 94. The combustion gases then exit the leading end 95 of each tube 94 at a pressure $P_2$ sufficient to form a bore in the primary fibers 68. Each tube 94 is operatively adapted and positioned so that no molten glass enters its trailing end 96 during the fiber forming process.

The gas flow rate through each tube 94 can be calculated according to the following equation:

$$Q = \pi D^4 / 128 \mu (P_1 - P_2 / L + p w^2 R), \text{ where}$$

Q=the gas flow rate, $\mu$=the gas viscosity,

L=the tube 94 length,

D=the tube 94 inside diameter, $P_1$=the gas pressure inside spinner 60 (governed by fiberizer 14), $P_2$=the gas pressure at the tube's exit 95 (generally atmospheric pressure or less), p=the gas density, w=the spinner RPM (revolutions per minute), and R=the mean radial location of tube 94.

The leading end 95 of each tube 94 is coaxially positioned within its orifice 90 and sized so as to provide a gap of sufficient dimension between the tube 94 and the perimeter of the orifice 90 to permit a sufficient amount of the molten A and B glasses to be extruded therethrough to form a hollow primary glass fiber 68. The primary fibers 68 preferably have an outside diameter in the range of about four (4) to about six (6) microns.

Each tube 94 preferably has an overall length in the range of about 0.75" (1.9 cm) to about 1.50" (3.81 cm), an outside diameter in the range of about 0.016" (0.406 mm) to about 0.100" (2.54 mm), and a wall thickness in the range of about 0.004" (0.102 mm) to about 0.020" (0.508 mm). The leading end 95 of each tube 94 is preferably positioned somewhere in the region ranging from within the outer surface of the wall 64 a distance equal to about twice the outside diameter of the tube 94 to beyond the outer surface of the wall 64 a distance equal to about twice the outside diameter of the tube 94. While the leading ends 95 may not need to extend beyond wall 64, the leading ends 95 are more preferably either about flush with the outer surface of wall 64 or extending therefrom up to and including a distance equal to about the outside diameter of the tube 94.

As shown, the passages 92 and 93 are generally vertically aligned and are preferably of like size (i.e., the same length and diameter) and supplied with glass at the same flow rate to provide equal flow lengths for the A and B glass components. This ensures that when the A and B components exit orifices 90 in side-by-side relation, there will be approximately equal amounts of A and B glasses for each fiber. It will be recognized that if unequal proportions of the A and B glasses in the dual component fibers is desired, the rate at which each glass is supplied to the spinner 60 or the dimensions that passages 92 and 93 are sized may be varied. Having unequal proportions of glass in the dual component fibers may be desirable in certain instances. Additionally, the passages in each compartment may vary in size to provide a variation in the ratios of A and B glasses in the dual component fibers formed.

The number of passages 92 and 93 formed depends on the height of the spinner peripheral wall. The number and size of the passages 92 and 93 and the slots 89 as well as the flow rate of the molten glasses into compartments 88 are chosen to build up a "head" of molten material covering the passages in each compartment. While each set of passages 92 and 93 and orifice 90 can be in the form of a separate nozzle mountable in and removable from peripheral wall 64, each nozzle is preferably an integrally formed part of spinner wall 64 because a greater number of orifices 90 can be provided, increasing fiber production.

Figure 5:
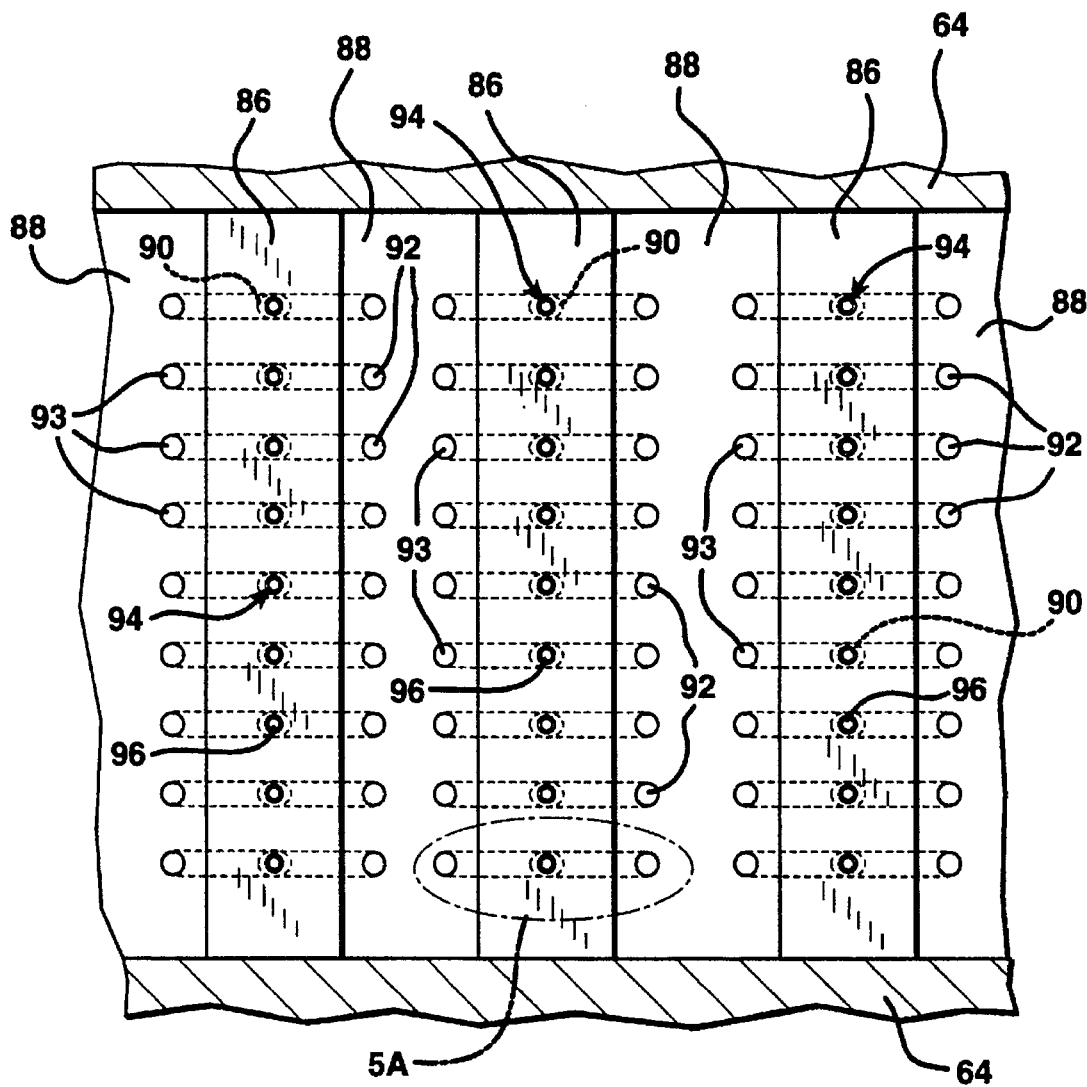
FIG. 5 is a schematic partial view, in elevation, of the spinner taken along line 5—5 of FIG. 4.
Figure 5A:
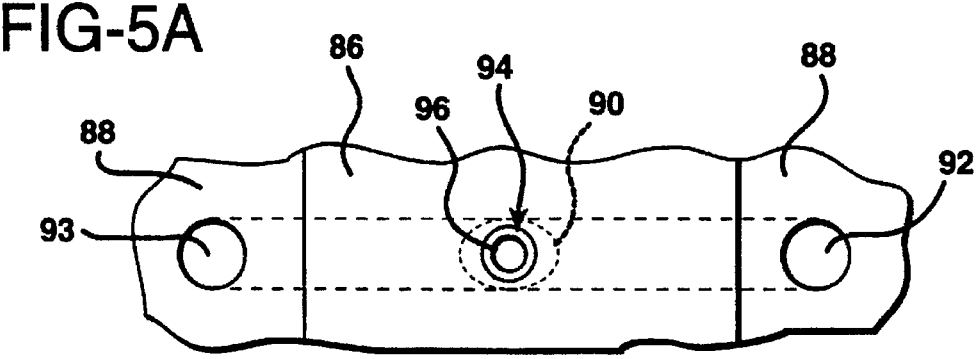
FIG. 5A is an enlarged view of the encircled area 5A of FIG. 5.
Figure 6:
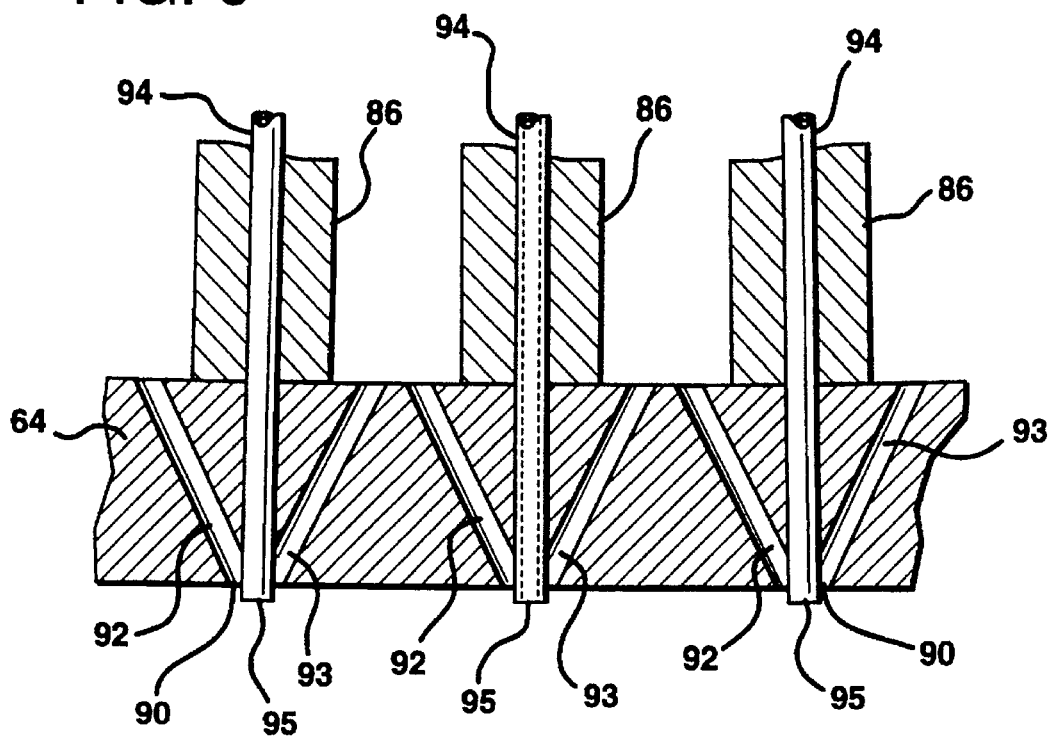
FIG. 6 is a partial cross-sectional view of a V-hole embodiment of the orifices in the spinner.
Figure 7:
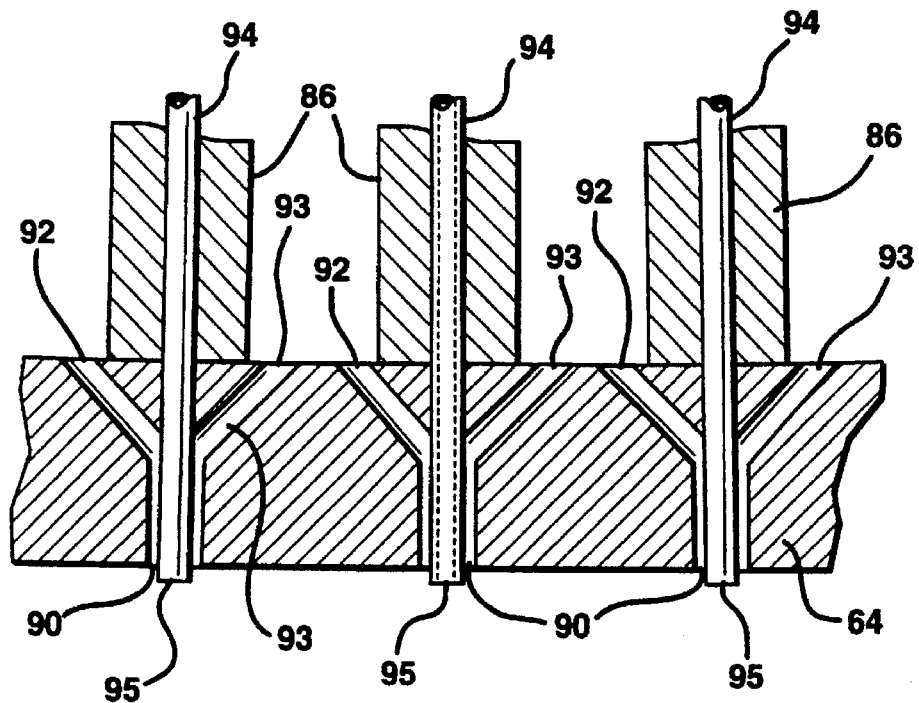
FIG. 7 is a partial cross-sectional view of a Y-hole embodiment of the orifices in the spinner.
Figure 8:
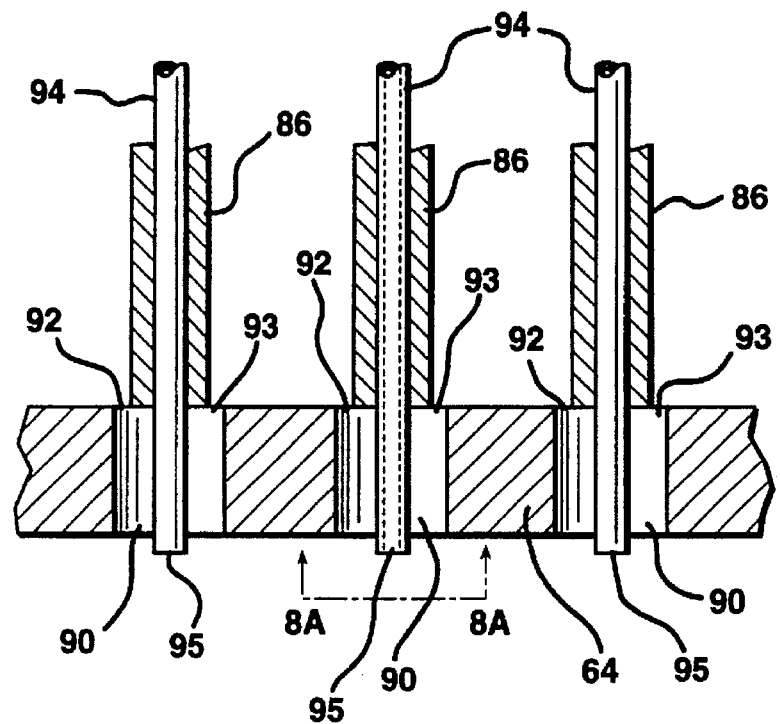
FIG. 8 is a partial cross-sectional view of a slotted embodiment of the orifices in the spinner.
Figure 8A:
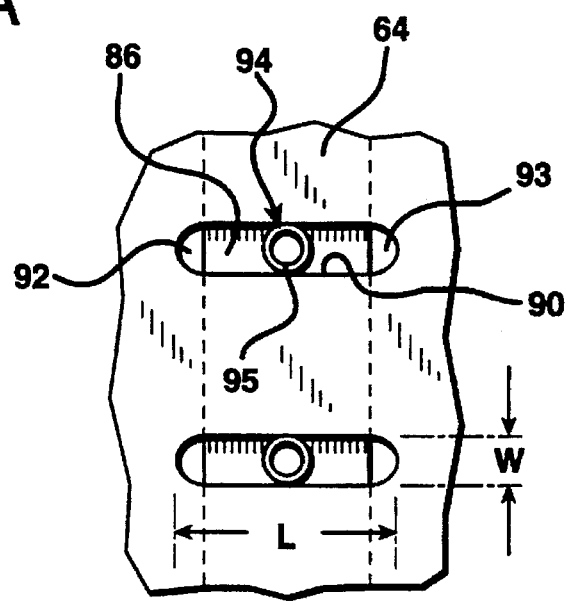
FIG. 8A is a view of the spinner taken along line 8A—8A of FIG. 8.

Orifices 90, and passages 92 and 93 may be drilled into the spinner wall by any of several known drilling techniques such as laser drilling, electrical discharge milling (EDM), or electron beam drilling. As best shown in FIGS. 6 and 7, passages 92 and 93 are preferably drilled at an angle of from about 14° to about 45° (i.e., a relative angle between them of about 28° to 90°) from normal to the spinner peripheral wall 64. Depending upon the angle chosen, passages 92 and 93 may form a V-shape as shown in FIGS. 5, 5A and 6, or along with orifice 90 a Y-shape as shown in FIG. 7. The optimum drilling angle from normal for the V-shape passages 92 and 93 is about 25° and for the Y-shape is between about 22.5° and about 45°. Other configurations can be used to converge the dual streams of glass together. For example, each passage 92 and 93 could communicate with a slotted orifice 90 that extends substantially completely through the wall 64, such as that shown in FIGS. 8 and 8A, or into any other operatively shaped slotted orifice 90. For the slotted orifice 90 of FIGS. 8 and 8A, orifice 90 preferably has a length L in the range of about 0.1 to about 0.13 inches (0.254 to 0.330 cm) and a width W in the range of about 0.006 to about 0.015 inches (0.152 to 0.381 mm).

The preferred diameter of the orifice 90 used with either the V- or Y-shape is in the range of about 0.0287 to about 0.113 inches (about 0.0729 to about 0.287 cm) depending upon the outside diameter of the tube 94 being used. Typically, passages 92 and 93 will have diameters in the range of from about 0.023 to about 0.121 inches (about 0.058 to about 0.307 cm), and preferably from about 0.0287 to about 0.1093 inches (about 0.0729 to about 0.2776 cm). For example, when a tube 94 having an outside diameter of about 0.016" is used, the orifice 90 may have a diameter in the range of about 0.0287 to about 0.047 inches and the passages 92 and 93 may have diameters in the range of about 0.023 to about 0.059 inches. When the tube 94 has an outside diameter of about 0.040", the diameter of the orifice 90 may be in the range of about 0.0476 to about 0.063 inches and the passage diameters in the range of about 0.0437 to about 0.075 inches. And, when the tube 94 has an outside diameter of about 0.100", the orifice diameter may be in the range of about 0.1035 to about 0.113 inches and the passage diameters in the range of about 0.1016 to about 0.121 inches.

Exemplary nozzles, with the Y-shaped form of passages 92 and 93 (see FIG. 7), and tubes were successfully tested. The passages 92 and 93 in each test nozzle had the same length of about 0.124" (0.315 cm) and diameter of about 0.030" (0.076 cm), with the passages being pitched at an angle of about 35.4° from normal to the spinner peripheral wall 64. Each orifice 90 had a diameter of either about 0.055" (0.140 cm) or about 0.058" (0.147 cm). Each tube 94 had an overall length of about 2.0" (5.08 cm), an outside diameter of about 0.040" (0.102 cm), and a wall thickness of about 0.010" (0.254 mm). The leading end 95 of each tube 94 extended beyond wall 64 a distance D of about 0.020" (0.508 mm).

The irregularly-shaped hollow fibers of the present invention are dual-glass fibers, i.e., each fiber is composed of two different glass compositions, glass A and glass B. If one were to make a cross-section of an ideal irregularly-shaped hollow glass fiber of the present invention, one half of the fiber would be glass A, with the other half glass B. In reality, a wide range of proportions of the amounts of glass A and glass B may exist in the various irregularly-shaped hollow glass fibers in the wool insulating material (or perhaps even over the length of an individual fiber). The percentage of glass A may vary within the range of from about 15 to about 85% of the total glass in each of the irregularly-shaped hollow glass fibers with the balance of total glass being glass B. In general, insulation products of the present fibers will consist of hollow fibers of all different combinations of the percentages of glass A and glass B, including a small fraction of hollow fibers that are single component. The proportion of glass A to glass B present in the hollow fibers can be determined by cross-sectioning a representative sample of fibers and examining each cross section by scanning electron microscopy (SEM) or any other suitable method.

Figure 10:
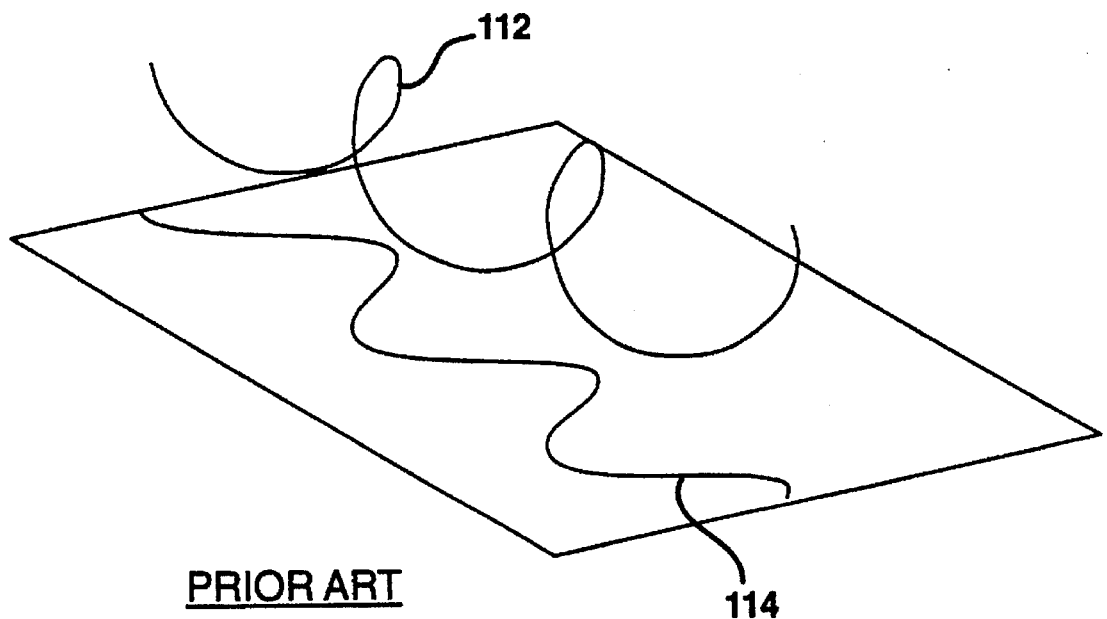
FIG. 10 is a schematic view in perspective of a helical solid glass fiber of the prior art.

The present dual-glass hollow fibers have a curvilinear nature due to the difference in thermal expansion coefficients of the two glasses. Thus, as the dual-glass hollow fiber cools, one glass composition contracts at a faster rate than the other glass composition. The result is stress upon the fiber. To relieve this stress the fiber must bend. If no rotation of the fiber is introduced, a flat coil having a generally constant radius of curvature will be produced, the coil being in one plane such as in a typical clock spring. Rotation of dual-glass fibers can be measured by reference to the interface along the hollow fiber between the two glass components. In order to get out of a single plane relation, some rotation must be introduced. Constant rotation of the fibers will produce a helix having a constant pitch. The hollow fiber making up the helix has a constant direction of rotation—either clockwise or counter-clockwise. The helix also has a generally constant radius of curvature. FIG. 10 shows a 3-dimensional schematic projection of a helically shaped single glass solid fiber 112 of the prior art. As an aid to visualization, the shadow 114 of the fiber 112 cast by an overhead light onto a flat surface has been added.

Figure 11:
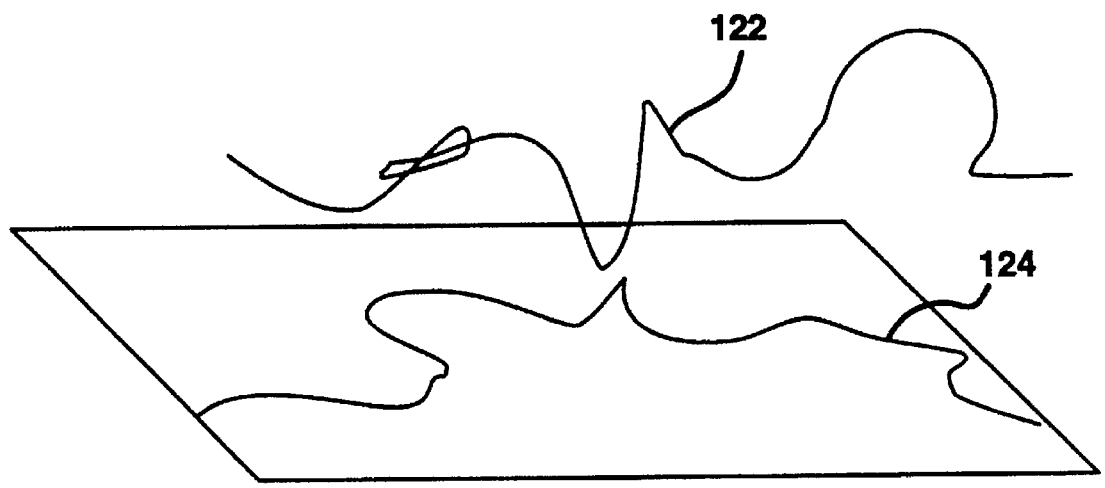
FIG. 11 is a schematic view in perspective of a irregularly-shaped hollow glass fiber of the present invention in a natural, unconstrained state.
Figure 12:
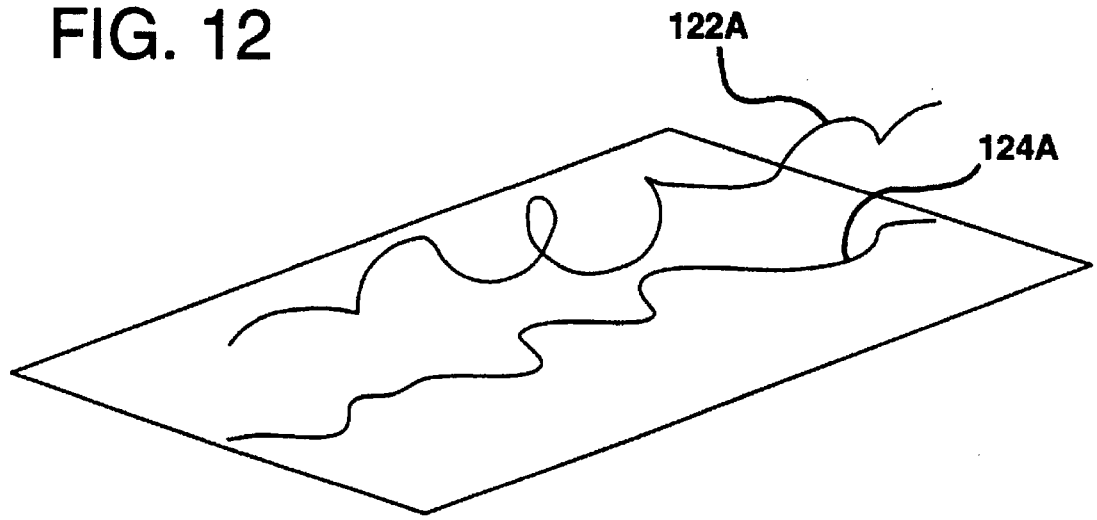
FIG. 12 is a schematic view in perspective of the fiber of FIG. 11 in a stretched state.
Figure 13:
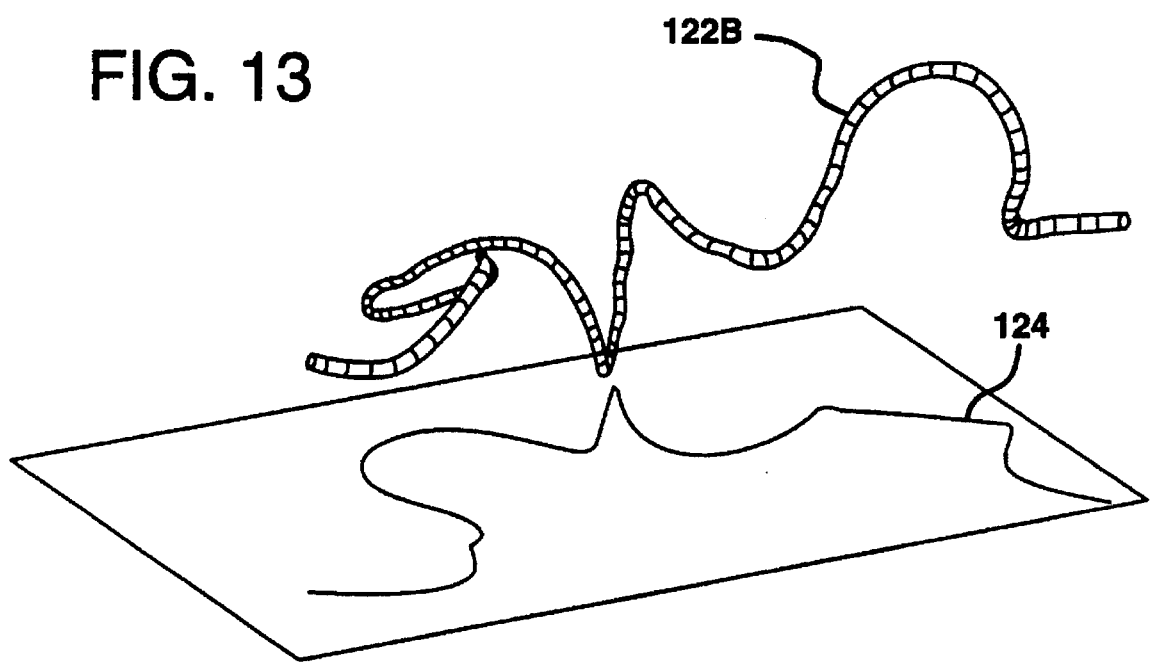
FIG. 13 is an artistically enhanced schematic view in perspective of the irregularly-shaped hollow glass fiber of FIG. 11.

An. irregularly-shaped hollow fiber of the invention differs from a helically shaped single glass solid fiber in that the rotation of the inventive fiber is not constant, but rather varies irregularly both in direction (clockwise and counter-clockwise) and in magnitude. The magnitude of rotation of a fiber is how sharply the fiber twists and turns per unit length of the fiber. The curvature is generally constant as dictated by the difference in thermal expansion coefficients and the A/B proportion. FIG. 11 shows a 3-dimensional projection of an irregular hollow fiber 122 of the invention. As an aid to visualization, the shadow 124 of the fiber 122 cast by an overhead light onto a flat surface has been added. When fiber 122 is put under tension, the tensioned fiber 122A and corresponding shadow 124A illustrate that the irregularity of the fiber is maintained, as shown in FIG. 12. Irregular hollow fiber 122B, shown in FIG. 13, is fiber 122 of FIG. 11 artistically enhanced by exaggerating the thickness and by adding segmentation lines to show better perspective.

Due to a continuously changing attenuation environment, each irregularly-shaped hollow fiber is twisted in a unique way. No two fibers are exactly alike. The hollow fiber's final shape is one with a baseline curvature due to the dual-glass nature, which is modified by the twisting, irregular rotation of the plane of curvature caused by the continuously changing or stochastic attenuation environment. The fiber has a baseline curvature that is twisted through three dimensions. It is generally not helical. The fiber's irregular nature allows the fibers to stand apart from one another and achieve a uniform volume filling nature. Additionally, wool insulation material made of irregularly-shaped hollow glass fibers is less irritating (not as itchy) to the skin as wool insulating materials made with primarily straight fibers, and may not be as dusty.

The nature of the irregularly shaped hollow fibers may be analyzed using a direction vector analysis. The set of coordinates describing the path of an irregularly shaped hollow fiber in 3-D space may be generated using photographs taken from two different angles, 90° apart. The coordinates may be adjusted to give equal three dimensional distances between the data points along the length of the fiber, in order to produce adjusted coordinate data points (ACD). Three vectors may be computed for each of the ACD's as follows:

$\overline{V}_i$=Fiber direction vector (a unit vector directed from one ACD to the next)

$\overline{F}_i$=First derivative vector of $\overline{V}_i$ with respect to the distance interval between ACD's $\overline{S}_i$=Second derivative vector of $\overline{V}_i$ with respect to the distance between ACD's.

The magnitude of rotation $R_i$ for any given ACD is as follows:

$R_i = \overline{S}_i \cdot \overline{U}_i$ (vector dot product), where $$\overline{U}_i = \frac{\overline{V}_i \times \overline{V}_{i-1}}{|\overline{V}_i \times \overline{V}_{i-1}|} \text{ (vector cross product)}$$

$\overline{U}_i$ is a unit vector perpendicular to the plane containing $\overline{V}_i$ and $\overline{V}_{i-1}$.

The magnitude of rotation R can be plotted in graph form as a function of distance along the length of the hollow fiber. The data used in such a graph may be smoothed with a 5 point weighted moving average to reduce noise accentuated by the derivatizing process. Based on such data compiled for solid dual glass fibers, the rotation of an unconstrained irregularly shaped hollow fiber of the invention should vary irregularly in magnitude and sign along the length of the fiber. It is believed that the crossover points (i.e., where the rotation changes sign) will occur at a frequency of about one per centimeter for a five (5) micron outside diameter hollow fiber. In contrast, a helically shaped single glass solid fiber has zero crossover points along the same length. It is expected that the number of crossover points per centimeter of the irregular hollow fibers of the invention for a 5 micron outside diameter fiber will be at least 0.3 and most likely within the range of from about 0.5 to about 5.0.

Another way to quantify the irregularity of the fibers is to calculate the average rotation magnitude and the standard deviation of the rotation magnitudes along the length of the fibers. The average value for the magnitude of rotation for a helically shaped single glass solid fiber is well above zero (or well below zero for opposite rotation). The standard deviation of the magnitude of rotation for the helix is smaller than the average value of the magnitude of rotation. The ratio of standard deviation to the average magnitude of rotation is 0.25 for a typical helically shaped single glass solid fiber.

In contrast, for an irregularly shaped hollow fiber of the invention, the average magnitude of rotation is expected to be very small, generally close to zero. The standard deviation of the magnitude of rotation is also expected to be at least comparable to the average magnitude of rotation, if not significantly larger than the average magnitude of rotation. Preferably, the ratio of the standard deviation to the average magnitude of rotation will be greater than about 0.75. More preferably, it will be greater than 1.0 and most preferably it will be greater than 5.0. It is expected that the ratio for the inventive hollow fibers will be 8.3 or even higher.

The irregular shape of the fibers gives the wool insulating material a more uniform volume filling nature. The primarily straight fibers of the prior art are arranged haphazardly in the wool pack. They are not uniform in volume filling. By uniform volume filling it is meant the fibers have a desire to spread out and fill the entire volume available to them in a uniform manner. A more uniform volume filling nature allows a more efficient use of glass fibers to resist the flow of heat.

In addition to the benefits from an irregular shape, by employing fibers that are hollow, more fibers can be used to form the wool batt without increasing the total amount of insulating material used. With more fibers being used, the overall surface area of the fibers in the wool increases. Increasing the fiber surface area in the wool lowers the thermal conductivity of the insulation product. Thus, with hollow fibers, less insulation material is needed to produce a product with the same or better insulating capabilities. With or without a substantial improvement in performance, such a product can be more competitively priced because with less insulation material being used the material costs and in turn the cost of the product can be reduced.

The hollow nature of the present fibers may be quantified in terms of their void fraction, which is defined as $(D_i/D_o)^2$, where $D_i$ is the inside diameter and $D_o$ is the outside diameter of the fiber. Each of the preferred irregularly shaped hollow glass fibers has a void fraction of greater than about 30%, more preferably greater than about 40%, and even more preferably in the range of from about 50% up to and including about 80%. As the void fraction increases, the number of hollow fibers that can be produced from the same amount of glass also increases, somewhat exponentially. For example, about twice as many hollow fibers having a void fraction of 50% can be produced from an amount of glass compared to the number of solid fibers of the same size that can be produced. The number of hollow fibers increases to about ten times as many as solid fibers as their void fractions approach 90%. It is believed that the amount of protrusion or retraction of the tube end 95 relative to the outer surface of the spinner wall 64 will affect the void fraction of the glass fibers produced therefrom. The void fraction of the hollow fibers should increase, up to a point, as the leading ends 95 extend further beyond the outer surface of wall 64.

Thermal conductivity or k value is a measure of a material's ability to conduct heat. Thus, the lower a material's k value the better that material is as an insulator. Also, in general, the more uniform the lattice of the material and the more fiber surface area there is, the greater that material's insulation ability. Thus, thermal conductivity can be a measure of the uniform volume filling nature of the insulation material as well as the total fiber surface area. Building insulation products are quantified by their ability to retard heat flow. Resistance to heat flow or R value is the most common measure of an insulation product's ability to retard heat flow from a structure. R-value is defined by the equation: R value=t/k, where R-value is resistance to heat flow in hrft$^2$ °F./Btu (m$^2$ °C./Watt); t is recovered thickness in inches; and k is thermal conductivity in Btu in/hrft$^2$ °F. (Watt/m °C.).

Insulation products of the present invention are expected to exhibit a substantial reduction in k values from that of the prior art using less glass material and using fibers with the same outside diameter. The wool insulating material of the present invention is expected to require approximately 5 to 8½% less glass than the solid fiber prior art material, to reflect the same k values and generate an equivalent R value, as a result of only its irregular shape. Significant reductions, of as much as half or more, in the amount of glass needed to generate an equivalent R value is expected as a result of the present fibers being hollow. Comparable weight savings is expected to be seen in light, medium and high density insulating materials. In comparing prior art insulation products of the same weight (i.e., same glass content), such products of the present invention are expected to have a greater fiber content, by up to twice or more, and in turn an overall larger fiber surface area than that of a prior art product made with solid fibers. Having more fiber surface area, the present insulation products are expected to exhibit a directly related decrease in thermal conductivity (i.e., increase in R value). Thus, the present invention is expected to enable insulation products to be produced with greater insulating capabilities for the same cost as well as less expensive insulation products that perform the same, compared with similar prior art products.

By making the fibers hollow according to the principles of the present invention, reductions in k values, for a set density and effective fiber outside diameter, are believed possible. By way of example only, it is anticipated that insulation products of the present invention having a density of 0.5 pcf and made with irregularly shaped hollow fiber having an outside diameter of 5 microns and a void fraction of 30% will exhibit a k value of about 0.287 Btu in/hrft$^2$ °F. or better. It is further anticipated that with everything else remaining the same, the k value will drop to about 0.281 Btu in/hrft$^2$ °F. when the fibers have a void fraction of 40%, to about 0.273 Btu in/hrft$^2$ °F. when the fibers have a void fraction of 50%, to about 0.248 Btu in/hrft$^2$ °F. when the fibers have a void fraction of 80%, and to about 0.233 Btu in/hrft$^2$ °F. when the fibers have a void fraction of 90%.

Insulation products are packaged in high compression in order to ship more insulation in a defined volume, such as a truck. At the point of installation the insulation product is unpackaged and the product expands or recovers. The thickness to which the insulation product recovers is referred to as the recovered thickness. A specific thickness of insulating material is required to perform to a specified R value.

The ability of an insulation product to recover depends upon both the uncompressed product density and the density to which the product is compressed. Wool insulating material can be generally classified into three broad categories: light, medium and heavy density. Light density insulation products are those with a product density within the range of 0.15 to 0.6 pcf (2.4 to 9.6 Kg/m$^3$). Medium density insulating materials are those with a product density of from 0.6 to 0.9 pcf (9.6 to 14.4 Kg/m$^3$). Heavy density wool insulating materials are those higher than 1.0 pcf (16 Kg/m$^3$).

The compressed density is the density to which the wool batt can be compressed for shipping while still maintaining a satisfactory recovery. If a product is compressed to too high a density, a substantial portion of the glass fibers may break. As a result, the product will not recover to a satisfactory thickness. For prior art light density insulation products of straight solid fibers, the maximum practical compressed density is from about 3 to about 6 pcf (48 Kg/m$^3$ to 96 Kg/m$^3$), depending on the product density.

Light density wool insulating materials of the present invention are expected to produce dramatically improved recovery properties due to the unique shape and properties of the irregularly-shaped fibers. Being binderless, one would expect irregularly-shaped glass fibers to slide upon compression as do the binderless straight fibers of the prior art. However, the irregularly-shaped fibers cannot slide very far because the irregular shape catches on neighboring fibers, thereby preventing significant movement. Further, there is no binder placing stress on the fibers near the intersections. Rather, the irregularly-shaped fibers twist and bend in order to relieve stress. Thus, the fibers' positions are maintained and any available energy for recovery is stored in the fiber. This stored energy is released when the compression is removed and the fibers return to their recovered position.

A wool insulation product can contain up to twice as many or more hollow fibers, compared to another product made from an equal amount of glass and containing the same size, i.e., same length and outside diameter, but solid fibers. However, even if the number of hollow fibers used in the wool product is increased by up to twice as many or more, it is believed that such an increase will not significantly diminish the wool's compressibility or its ability to recover. For one reason, no binder is used, and for another, the irregularly shaped fibers are able to store recovery energy. In addition, even if fully compressed, the wool would not come close to the 100% theoretical density of the glass (i.e., about 160 pcf). However, even if at some point the increase in hollow fibers did significantly diminish the compressibility and recoverability of the wool product, there will likely be enough of an increase in the fiber content of the wool to still improve its insulating capabilities.

The term recovery ratio in the present invention is defined as the ratio of recovered density to compressed density, after an insulation product is compressed to the compressed density, unpackaged, and allowed to recover to the recovered density, according to ASTM C167-90. For example, an insulation product compressed to a density of 6 pcf (96 Kg/m$^3$) which recovers to 0.5 pcf (8 Kg/m$^3$) has a recovery ratio of 12:1. In general, the overall appearance (i.e., irregular shape) of a dual-glass hollow fiber is about the same as that of a dual-glass solid fiber. Light density wool batts made of irregularly-shaped solid, rather than hollow, fibers in accordance with U.S. patent application Ser. No. 08/148, 098, filed Nov. 5, 1993, now U.S. Pat. No. 5,431,992 and entitled DUAL-GLASS FIBERS AND INSULATION PRODUCTS THEREFROM, the disclosure of which is hereby incorporated by reference, may be compressed to a compressed density within the range of about 6 to about 18 pcf (96 to 288 Kg/m$^3$) and recover to a recovered density of within the range of about 0.3 to about 0.6 pcf (4.8 to 9.6 Kg/m$^3$). This is a recovery ratio within the range of from 12:1 to about 50:1. Light density wool batts made with the present hollow fibers are expected to perform comparably. Preferably, insulation products of the invention will be compressed to a compressed density within the range of from about 9 to about 18 pcf (144 to 288 Kg/m$^3$) and are expected to recover to a recovered density within the range of from about 0.3 to about 0.6 pcf (4.8 to 9.6 Kg/m$^3$). Most preferably, the light density insulation products will be compressed to a density of within the range of from about 9 to about 15 pcf (144 to 240 Kg/m$^3$) and expected to recover to a recovered density of within the range of from about 0.3 to about 0.5 pcf (4.8 to 8 Kg/m$^3$).

Such a dramatic increase in the amount of compression that can be applied to light density insulation products of the present invention while still maintaining a satisfactory recovered density will have a significant effect. For standard R19 insulation products, it is expected that compressed density can be increased from around 4 pcf (64 Kg/m$^3$) to about 12 pcf (192 Kg/m$^3$) by employing irregularly-shaped glass fibers of the present invention. This translates to around 3 times as much insulating material which can be shipped in the same volume shipping container of a truck, rail car, etc. The potential savings in shipping cost is enormous. Furthermore, because shipping costs usually increase as shipping weight increases, products made with the present lighter weight hollow fibers can be shipped less expensively. In addition, being more compressible and light weight, the present insulation products provide benefits in storage and handling for warehousing, retailing and installing the product.

To achieve the unique irregularly-shaped hollow glass fibers of the present invention, specific compositions satisfying a number of constraints are required. The first constraint involves the coefficient of thermal expansion. There is no direct constraint on the values for the coefficient of thermal expansion of either glass A or glass B. Preferably, however, the coefficients of thermal expansion of glass A and glass B, as measured on the individual glasses by standard rod techniques, differ by at least 2.0 ppm/°C.

The dual-glass compositions of the present invention comprise one high-borate, low-soda lime-aluminosilicate composition as glass A and one high-soda, low-borate lime-aluminosilicate composition as glass B satisfy all constraints necessary for a successful irregularly-shaped hollow glass fiber. By high-borate, low-soda lime-aluminosilicate composition, it is intended that the glass composition have a borate content of within the range of about 14% to about 24% by weight of the total components. By a high-soda, low-borate lime-aluminosilicate composition, it is intended that the glass composition have a soda content within the range of from about 14% to about 25% by weight of the total components.

Preferably, the first glass composition comprises by weight percent from about 50 to about 61% silica or SiO$_2$, from about 0 to about 7% alumina or Al$_2$O$_3$, from about 9 to about 13% lime or CaO, from about 0 to about 5% magnesia or MgO, from about 14–24% borate or B$_2$O$_3$, from about 0 to about 10% soda or Na$_2$O, and from about 0 to about 2% potassium oxide or K$_2$O.

The second glass composition is preferably one which comprises by weight percent from about 52 to about 60% silica or SiO$_2$, from about 0 to about 8% alumina or Al$_2$O$_3$, from about 6 to about 10% lime or CaO, from about 0 to about 7% magnesia or MgO, from about 0 to about 6% borate or B$_2$O$_3$, from about 14 to about 25% soda or Na$_2$O, and from about 0 to about 2% potassium oxide or K$_2$O. It is understood that in each composition there will typically be less than about 1% total of various other constituents such as, for example Fe$_2$O$_3$, TiO$_2$ and SrO, not intentionally added to the glass, but resulting from the raw materials used in the batch formulation.

More preferably, the dual-glass composition of the present invention comprises a first glass composition containing approximately 52–57% silica, 4–6% alumina, 10–11% lime, 1–3% magnesia, 19–22% borate, 4–6% soda, 0–2% potassium oxide, and a second glass composition containing approximately 57–65% silica, 2–6% alumina, 8–9% lime, 4–6% magnesia, 0–6% borate, 15–21% soda, and 0–2% potassium oxide. While certain representative embodiments and details have been shown for purposes of illustrating the invention, it will be apparent to those skilled in the art that various changes in the methods and apparatus disclosed herein may be made without departing from the scope of the invention, which is defined in the appended claims.

We claim:

1. Apparatus for making multiple component hollow fibers suitable for use as an insulation product, said apparatus comprising:

a rotary spinner with a housing having a wall with an interior and exterior and being divided into first and second compartments for receiving respectively first and second thermoplastic materials;

a plurality of nozzles associated with said wall, each nozzle including a first and a second passage through which a first and a second molten thermoplastic material respectively flow to an orifice to form a multiple component fiber, the first and second passages of said nozzle being respectively in fluid communication with said first and second compartments; and a plurality of gas conduits associated with said wall, each conduit being operatively adapted for ingesting a gas into the molten thermoplastic materials flowing out of one said orifice to thereby form a multiple component hollow fiber.

2. An apparatus as claimed in claim 1, wherein each of said nozzles is an integrally formed part of said housing.

3. An apparatus as claimed in claim 1, wherein said apparatus is operatively adapted so as to form hollow fibers having a void fraction of about 30% or more.

4. An apparatus as claimed in claim 1, wherein said apparatus is operatively adapted so as to form hollow fibers having a void fraction of about 40% or more.

5. An apparatus as claimed in claim 1, wherein said apparatus is operatively adapted so as to form hollow fibers having a void fraction in the range of about 50% to about 80%.

6. An apparatus for making multiple component hollow fibers comprising:

a) a spinner having a peripheral wall, and further including orifices located in said peripheral wall for centrifuging hollow fibers, said spinner being divided into a series of compartments by baffles positioned circumferentially around the interior of said peripheral wall;

b) equipment for supplying at least a first and a second molten thermoplastic material to said spinner;

c) a divider for directing said first molten thermoplastic material into alternate ones of said compartments and for directing said second molten thermoplastic material into the remaining ones of said compartments so that adjacent compartments contain different thermoplastic materials;

d) passages in said peripheral wall and extending from each of said compartments through which said molten thermoplastic materials flow to said orifices in said peripheral wall of said spinner, said passages in adjacent ones of said compartments communicating with one another and with said orifices; and e) a plurality of gas conduits, each of said conduits being associated with one of said orifices for ingesting gas into the molten thermoplastic materials flowing out of said one orifice to thereby form a multiple component hollow fiber.

7. An apparatus as claimed in claim 6, wherein each of said gas conduits comprises a tube extending through one of said baffles and into said peripheral wall.

8. An apparatus as claimed in claim 7, wherein each of said orifices has a perimeter and each said tube has an outside diameter sized so as to provide a gap between it and the perimeter of a corresponding orifice to permit the molten thermoplastic materials to be extruded through said gap.

9. An apparatus as claimed in claim 7, wherein said peripheral wall has an outer surface, and each said tube has an outside diameter and a leading end positioned in a region ranging from within the outer surface of said peripheral wall a distance equal to about twice the outside diameter of said tube to beyond the outer surface of said peripheral wall a distance equal to about twice the outside diameter of said tube.

10. An apparatus as claimed in claim 7, wherein said peripheral wall has an outer surface, and each said tube has an outside diameter and a leading end positioned in a region ranging from being about flush with the outer surface of said peripheral wall to beyond the outer surface of said peripheral wall a distance equal to about the outside diameter of said tube.

11. An apparatus as claimed in claim 6 in which adjacent ones of said passages in adjacent compartments join together in one of a V-shape, a Y-shape, and a slot.

12. An apparatus as claimed in claim 6 in which adjacent ones of said passages in adjacent compartments converge at an angle of from about 14° to 45° from normal to said peripheral wall.

13. An apparatus as claimed in claim 6 in which said passages have a diameter of from about 0.023 inch to about 0.121 inch.

14. An apparatus as claimed in claim 6 in which said passages are sized to provide a build up of molten thermoplastic materials in said compartments.

15. An apparatus as claimed in claim 6 in which said passages in said adjacent compartments are of substantially the same diameter and length.

16. An apparatus as claimed in claim 6 in which said series of compartments are generally vertically-aligned and said divider includes a generally horizontal flange positioned intermediate the spinner peripheral wall and a generally vertical interior wall, said interior wall including a series of orifices therein spaced to provide access for said first molten thermoplastic material into alternate ones of said compartments and to provide access for said second molten thermoplastic material into the remaining ones of said compartments.

17. An apparatus as claimed in claim 6, wherein said passages, orifices and gas conduits are operatively adapted so as to form a plurality of irregularly shaped hollow fibers when the first and a second molten thermoplastic materials being supplied to said spinner have at least one different mechanical attribute so that, upon cooling, each of the hollow fibers will assume an irregular shape.

18. An apparatus as claimed in claim 6, wherein said passages, orifices and gas conduits are operatively adapted so as to form a plurality of irregularly shaped hollow fibers when the first and a second molten thermoplastic materials being supplied to said spinner have different coefficients of thermal expansion.

19. An apparatus as claimed in claim 6, wherein said passages, orifices and gas conduits are operatively adapted so as to form a plurality of irregularly shaped hollow fibers when the first and a second molten thermoplastic materials being supplied to said spinner have different coefficients of thermal expansion, the difference being about 2.0 ppm/°C. or more.

* * * * *